(12) United States Patent
Akamine et al.

(10) Patent No.: US 8,211,824 B2
(45) Date of Patent: Jul. 3, 2012

(54) EXHAUST GAS PURIFICATION CATALYST

(75) Inventors: Masaaki Akamine, Hiroshima (JP); Masahiko Shigetsu, Higashi-Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/024,095

(22) Filed: Feb. 9, 2011

(65) Prior Publication Data

US 2011/0237429 A1   Sep. 29, 2011

(30) Foreign Application Priority Data

Mar. 26, 2010   (JP) ................................. 2010-071765

(51) Int. Cl.
| | |
|---|---|
| *B01J 23/00* | (2006.01) |
| *B01J 21/00* | (2006.01) |
| *B01J 20/00* | (2006.01) |
| *B01J 29/00* | (2006.01) |
| *B01J 37/00* | (2006.01) |

(52) U.S. Cl. ........ 502/332; 502/302; 502/303; 502/304; 502/333; 502/334; 502/335; 502/336; 502/337; 502/338; 502/339; 502/349; 502/355; 502/415; 502/439; 502/527.12; 502/527.13

(58) Field of Classification Search .......... 502/302–304, 502/332–334, 339, 349, 355, 415, 439, 527.12, 502/527.13; 422/170–180
See application file for complete search history.

(56) References Cited

U.S. PATENT DOCUMENTS

| | | | | |
|---|---|---|---|---|
| 5,318,757 | A * | 6/1994 | Abe et al. ........................ | 422/174 |
| 6,375,910 | B1 * | 4/2002 | Deeba et al. ................ | 423/239.1 |
| 6,464,946 | B1 * | 10/2002 | Yamada et al. ................ | 422/177 |
| 6,497,851 | B1 * | 12/2002 | Hu et al. ..................... | 423/213.5 |
| 6,576,200 | B1 * | 6/2003 | Tanaka et al. ................. | 422/177 |
| 6,808,687 | B1 * | 10/2004 | Uenishi et al. ................ | 422/177 |
| 6,846,466 | B2 * | 1/2005 | Matsumoto et al. .......... | 422/180 |
| 7,189,376 | B2 * | 3/2007 | Kumar et al. ................. | 422/177 |
| 7,276,212 | B2 * | 10/2007 | Hu et al. ....................... | 422/177 |
| 7,341,975 | B2 | 3/2008 | Iwakuni et al. | |
| 7,374,729 | B2 * | 5/2008 | Chen et al. .................... | 422/177 |
| 7,473,665 | B2 * | 1/2009 | Kawai et al. ................. | 502/217 |
| 7,507,098 | B1 * | 3/2009 | Hung ............................ | 439/159 |

(Continued)

FOREIGN PATENT DOCUMENTS

JP   2002-239390   8/2002

(Continued)

OTHER PUBLICATIONS

The Extended European Search Report dated Jul. 7, 2011; Application No. 11152846.9-2104.

*Primary Examiner* — Cam N. Nguyen

(74) *Attorney, Agent, or Firm* — Studebaker & Brackett PC; Donald R. Studebaker

(57) ABSTRACT

A catalytic metal 5 is supported on oxide particles 4, 6 in a first catalyst layer 2, and first binder particles 7 which are fine, and have oxygen ion conductivity are interposed among the oxide particles. A catalytic metal 11 is supported on oxide particles 8, 9, 12 in a second catalyst layer 3 provided on or above the first catalyst layer 2, and second binder particles 13 which are fine, and are capable of storing and releasing oxygen are interposed among the oxide particles.

4 Claims, 1 Drawing Sheet

U.S. PATENT DOCUMENTS

| | | | |
|---|---|---|---|
| 7,517,510 B2 * | 4/2009 | Chen et al. | 423/213.2 |
| 7,524,465 B2 * | 4/2009 | Kumar et al. | 422/180 |
| 7,550,124 B2 * | 6/2009 | Chen et al. | 423/213.2 |
| 7,622,096 B2 * | 11/2009 | Deeba et al. | 423/213.2 |
| 7,722,829 B2 * | 5/2010 | Punke et al. | 422/180 |
| 7,919,051 B2 * | 4/2011 | Li et al. | 422/171 |
| 7,922,988 B2 * | 4/2011 | Deeba et al. | 423/213.2 |
| 2006/0276331 A1 | 12/2006 | Akamine et al. | |
| 2009/0041636 A1 * | 2/2009 | Harada et al. | 422/177 |
| 2011/0045968 A1 * | 2/2011 | Akamine et al. | 502/303 |

FOREIGN PATENT DOCUMENTS

| | | |
|---|---|---|
| JP | 2007-031192 | 2/2007 |
| JP | 2008-062130 | 3/2008 |
| WO | 2008/097702 A1 | 8/2008 |
| WO | 2009/012348 A1 | 1/2009 |

\* cited by examiner

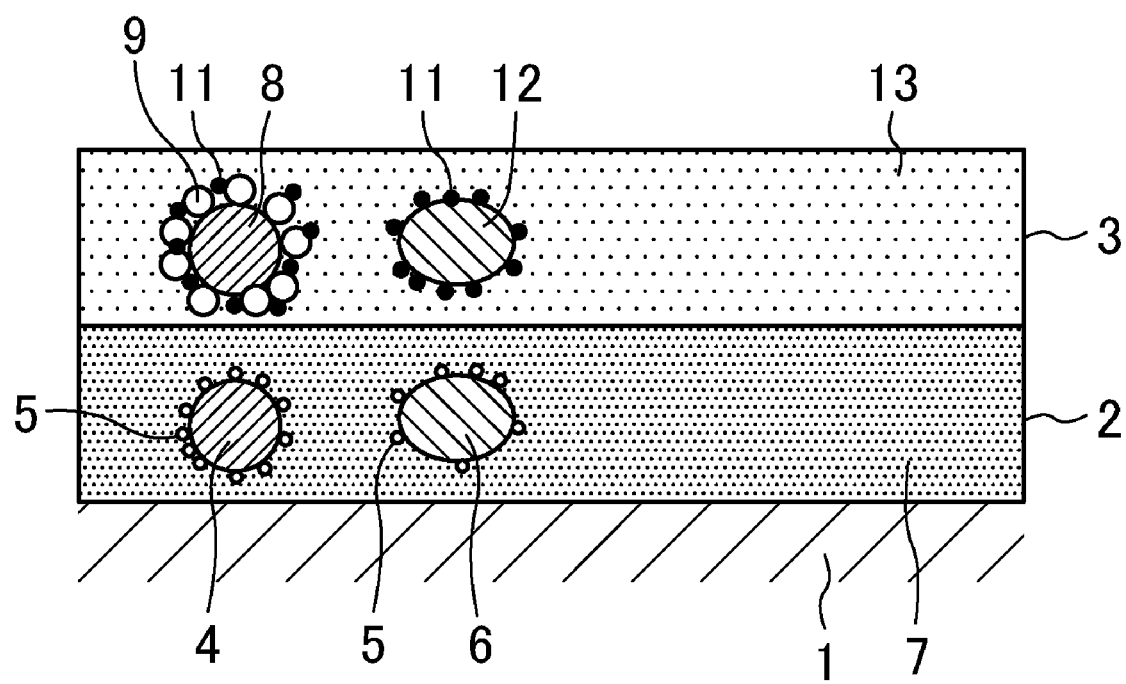

EXHAUST GAS PURIFICATION CATALYST

CROSS-REFERENCE TO RELATED APPLICATION

This application claims priority to Japanese Patent Application No. 2010-071765 filed on Mar. 26, 2010, the disclosure of which including the specification, the drawings, and the claims is hereby incorporated by reference in its entirety.

BACKGROUND

The present disclosure relates to exhaust gas purification catalysts.

Exhaust gas purification catalysts for purification of hydrocarbon (HC), CO, and nitrogen oxide (NOx) in engine exhaust gas often contain Pt, Pd, Rh, etc., as a catalytic metal. For example, a catalyst which is close-coupled to an exhaust manifold may be heated to a temperature as high as around 1100° C. In this case, even when the catalytic metal is dispersed and supported on activated alumina particles having a large specific surface area, the catalytic metal agglomerates, and purification performance is gradually reduced. According to conventional technologies, an increased amount of the catalytic metal is supported on the activated alumina particles etc. in expectation of this agglomeration. However, the catalytic metal is rare metal, and increasing the amount of the supported catalytic metal is not preferable in view of conservation of resources.

As a solution to this problem, a catalyst in which the amount of the catalytic metal is reduced by doping a support, such as Ce-containing oxide etc., with a catalytic metal has been and is being put into practice. For example, a Rh-doped catalyst has been practically used, in which Rh is provided at lattice points or between the lattice points of CeZr-based mixed oxide (composite oxide), and Rh is partially exposed on the surfaces of the mixed oxide particles. The CeZr-based mixed oxide has originally been known as a support capable of storing and releasing oxygen. When doped with Rh, the CeZr-based mixed oxide can store a significant amount of oxygen, and can store and release oxygen at a significantly increased rate. Thus, even when the amount of the catalytic metal is reduced, the Rh-doped catalyst shows significant purification performance as a three-way catalyst used for purification of the exhaust gas which alternately shows rich and lean A/F ratios.

For example, Japanese Patent Application No. 2006-334490 describes catalytic powder in which CeZr-based mixed oxide doped with a catalytic metal is supported on the surface of CeZr-based mixed oxide containing no catalytic metal. The catalytic powder is obtained by mixing and dispersing the CeZr-based mixed oxide containing no catalytic metal in a solution containing Ce, Zr, and the catalytic metal, and adding ammonia water to the obtained solution to cause coprecipitation. Then, a slurry prepared by mixing the obtained catalytic powder, alumina, a zirconia binder, and water is applied to a honeycomb support, dried, and baked. In this way, the three-way catalyst is obtained.

Japanese Patent Application No. 2008-62130 describes a three-way catalyst which includes a catalyst layer containing CeZrNd mixed oxide having a number average particle diameter of 20-50 nm, CeZrNd mixed oxide having a number average particle diameter of 100-200 nm, and a zirconia binder. The degree of deterioration of the obtained three-way catalyst can be determined at high precision based on an oxygen concentration.

Japanese Patent Application No. 2007-31192 describes sol of ceria-zirconia solid solution used for a catalyst for purifying automobile exhaust gas, wherein particles of the sol have an average particle diameter of 5-100 nm. Japanese Patent Application No. 2002-239390 describes an HC storing catalyst in which an Ag zeolite layer and a Pd catalyst layer are stacked on a support. In this catalyst, hydrated alumina is used as a binder of the Ag zeolite layer, activated alumina is used as a support of the Pd catalyst layer, and a zirconia binder is used as a binder of the Pd catalyst layer, thereby preventing exfoliation of the Pd catalyst layer.

SUMMARY

The Ce-containing oxide particles described in Japanese Patent Application No. 2006-334490 etc. are contained in the catalyst layer as secondary particles which are agglomerates of primary particles, and generally have a particle diameter of several μm. In the secondary particles, the amount of exhaust gas diffused inside the particles is extremely small, and the primary particles inside the secondary particles are hardly used for purification of the exhaust gas. That is, only the primary particles present on the surfaces of the secondary particles substantially contribute to the purification of the exhaust gas.

The Rh-doped CeZr-based mixed oxide particles allow increase in amount of stored oxygen, and increase in rate of oxygen storage/release. However, Rh exposed on the surfaces of the CeZr-based mixed oxide particles is part of the doped Rh, i.e., only a small amount of Rh directly contributes to the purification of the exhaust gas. Specifically, Rh present inside the CeZr-based mixed oxide particles contributes to the storage/release of the exhaust gas, but does not directly contribute to oxidation/reduction of exhaust gas components.

Further, binder particles are interposed among the Rh-doped CeZr-based mixed oxide particles, or among particles of the support carrying the catalytic metal. Although the binder particles can fix the particles of the support, and can fix the catalyst layer to the support, the binder particles prevent contact between catalyst components such as the Rh-doped CeZr-based mixed oxide, etc. and the exhaust gas. Therefore, the binder particles do not contribute to the purification of the exhaust gas.

In view of the foregoing, the present disclosure is directed to allow the catalytic metal contained in the catalyst layer, and the catalyst components which store and release oxygen to effectively act on the purification of the exhaust gas, and to allow every part of the catalyst layer to act on the purification of the exhaust gas without waste.

In the present disclosure, a catalyst component which stores and releases oxygen is used as a binder.

Specifically, the disclosed exhaust gas purification catalyst includes: a plurality of catalyst layers stacked on a support, wherein at least one catalytic metal of Pd, Pt, or Rh is supported on at least one of oxide particles of activated alumina particles or Ce-containing oxide particles in a first catalyst layer of the plurality of catalyst layers, and first binder particles which are fine, and have oxygen ion conductivity are interposed among the oxide particles, and at least one catalytic metal of Pd, Pt, or Rh is supported on at least one of oxide particles of activated alumina particles or Ce-containing oxide particles in a second catalyst layer of the plurality of catalyst layers formed on or above the first catalyst layer, and second binder particles which are fine, and are capable of storing and releasing oxygen depending on a change in an oxygen concentration in the exhaust gas are interposed among the oxide particles.

The expression that a second catalyst layer is formed on or above the first catalyst layer includes the case where the first catalyst layer is formed on a surface of the support directly, or indirectly with another catalyst layer interposed therebetween, and the second catalyst layer is formed on the first catalyst layer directly, or indirectly with another catalyst layer interposed therebetween, and the case where another catalyst layer is additionally formed on the second catalyst layer.

With this configuration, the catalytic metal is supported on at least one of the oxide particles of the activated alumina particles or the Ce-containing oxide particles in each of the first catalyst layer and the second catalyst layer. Therefore, the catalytic metal can contribute to the purification of HC, CO, or NOx in the exhaust gas when the catalytic metal contacts the exhaust gas.

When the A/F ratio of the exhaust gas changes, the second binder particles in the upper second catalyst layer store/release oxygen to absorb the change of the A/F ratio. This enlarges an A/F window in which the catalytic metal effectively acts on the purification of HC, CO, and NOx. In the lower first catalyst layer, the first binder particles having the oxygen ion conductivity capture oxygen in the atmosphere, and releases active oxygen whether the exhaust gas atmosphere is rich or lean, thereby accelerating the purification of the exhaust gas by the active oxygen.

The first binder particles having the oxygen ion conductivity, and the second binder particles capable of storing/releasing oxygen are fine particles. Thus, a path through which the exhaust gas or oxygen diffuses from surfaces of the particles to the inside of the particles is shortened. Therefore, not only the primary particles on the surfaces of the secondary particles, the primary particles inside the secondary particles can effectively act on oxygen ion conduction or storage/release of oxygen.

Since the binder in each of the first catalyst layer and the second catalyst layer is constituted of the particles having the oxygen ion conductivity, or the particles capable of storing/releasing oxygen, the particles and the exhaust gas are more likely to contact with each other, and the entire part of the catalyst layer can act on the purification of the exhaust gas without waste. Accordingly, a material which functions only as the binder is no longer necessary, or the amount of the binder material can be reduced when the binder material and the first or second binder particles are used together. This can reduce the entire volume of the catalyst layer as compared with the conventional catalyst layer. Specifically, thermal capacity of the catalyst layer can be reduced, thereby allowing quick temperature increase of the catalyst layer. This is advantageous in improving light-off performance of the catalyst.

The first binder particles may be, for example, mixed oxide containing Zr, and rare earth metal except for Ce. The second binder particles may be catalytic metal-doped mixed oxide containing Ce, and the catalytic metal.

BRIEF DESCRIPTION OF THE DRAWINGS

FIG. 1 is a cross-sectional view schematically illustrating an example of the disclosed exhaust gas purification catalyst.

DETAILED DESCRIPTION

An embodiment of the present disclosure will be described below with reference to the drawing. The following embodiment is set forth merely for the purposes of preferred examples in nature, and is not intended to limit the scope, applications, and use of the disclosure.

FIG. 1 schematically shows the structure of an exhaust gas purification catalyst (a three-way catalyst) suitable for purification of exhaust gas of automobiles. In FIG. 1, reference character 1 indicates a cell wall of a honeycomb support, on which a plurality of catalyst layers, i.e., a first catalyst layer 2, and a second catalyst layer 3 formed on or above the first catalyst layer 2, are stacked.

The first catalyst layer 2 contains a plurality of activated alumina particles 4, and a plurality of Ce-containing oxide particles 6 in a mixed state. These particles 4 and 6 support at least one catalytic metal 5 of Pd, Pt, or Rh. First binder particles 7 which are fine, and have oxygen ion conductivity are interposed among the particles supporting the catalytic metal.

The second catalyst layer 3 contains a plurality of activated alumina particles 8, and a plurality of Ce-containing oxide particles 12 in a mixed state. The activated alumina particles 8 support ZrLa mixed oxide particles 9. At least one catalytic metal 11 of Pd, Pt, or Rh is supported on particles including the activated alumina particles 8 and the ZrLa mixed oxide particles 9 supported thereon, and the Ce-containing oxide particles 12. Second binder particles 13 which are fine, and are capable of storing and releasing oxygen depending on a change in an oxygen concentration in the exhaust gas are interposed among the particles supporting the catalytic metal.

The first catalyst layer 2 which is not directly exposed to the exhaust gas preferably contains Pd as the catalytic metal 5, and is preferably Rh-free. The second catalyst layer 3 which is directly exposed to the exhaust gas preferably contains Rh as the catalytic metal 11, and is preferably Pd-free. Pt may be contained in one or both of the first catalyst layer 2 and the second catalyst layer 3. When Pt is contained in both of the catalyst layers, Pt may be impregnated in only a predetermined part of the support close to an entrance of the exhaust gas.

It has been known that Pd is easily thermally degraded as compared with Rh, and causes sulfur poisoning or phosphorus poisoning. When Pd is contained in the lower first catalyst layer 2, the upper second catalyst layer 3 reduces the thermal degradation, and the poisoning of Pd. Further, it has been known that Rh is degraded when alloyed with Pd. When the both catalytic metals are contained in different catalyst layers, the alloying can be prevented.

When Rh is supported on alumina, and a temperature of the catalyst is increased, Rh is dissolved in alumina in a state of a solid solution, and its activity tends to decrease. However, in the upper second catalyst layer 3, the ZrLa mixed oxide particles 9 are supported on the activated alumina particles 8, and Rh is supported on the particles including the activated alumina particles 8 and the ZrLa mixed oxide particles 9 supported thereon. This can avoid the deterioration of the catalyst caused by the dissolution of Rh.

Pd is mainly used as a catalytic metal in charge of oxidation and purification of HC and CO because oxidized Pd (PdO) allows easy oxidation of HC and CO which contact Pd. To oxidize Pd, Pd and a substance capable of storing and releasing oxygen are combined in most cases. However, the substance capable of storing and releasing oxygen captures oxygen in the atmosphere in a lean atmosphere, and PdO is easily reduced to become Pd (metal state). Even in the lean state, the exhaust gas contains HC and CO, which have to be oxidized and purified. Further, when the exhaust gas is changed from the lean state to stoichiometry, HC and CO rapidly increase, which have to be reliably oxidized and purified.

In the above-described catalyst structure, the first catalyst layer which contains Pd as the catalytic metal 5 includes the first binder particles 7 having the oxygen ion conductivity.

Therefore, whether the exhaust gas atmosphere is lean or rich, the first binder particles 7 capture oxygen in the atmosphere, and release active oxygen. This is advantageous for keeping Pd in the oxidized state. The advantages of the above-described catalyst will be described below by way of examples and comparative examples.

EXAMPLES AND COMPARATIVE EXAMPLES

Example 1

To obtain the catalyst structure shown in FIG. 1, a ceramic honeycomb support having a 3.5 mil ($8.89 \times 10^{-2}$ mm) thick cell wall, 600 cells per square inch (645.16 mm$^2$), and a capacity of about 1 L was used as the support 1. The first catalyst layer (lower layer) 2 contained a mixture of Pd/CeZrNdO, Pd/La—Al$_2$O$_3$, and a ZrY binder as the first binder particles 7 having oxygen ion conductivity. The second catalyst layer (upper layer) 3 contained a mixture of Rh/CeZrNdO, Rh/ZrLa/Al$_2$O$_3$, and a Rh-doped CeO$_2$ binder as the second binder particles 13 capable of storing and releasing oxygen.

Pd/CeZrNdO contained in the first catalyst layer 2 was prepared by supporting Pd as the catalytic metal 5 on CeZrNdO as the Ce-containing oxide particles 6. CeZrNdO was mixed oxide which contained Ce, Zr, and Nd, had a composition of CeO$_2$:ZrO$_2$:Nd$_2$O$_3$=23:67:10 (mass ratio), and supported 0.55% by mass of Pd. Pd/La—Al$_2$O$_3$ was prepared by supporting Pd as the catalytic metal 5 on La—Al$_2$O$_3$ as the activated alumina particles 4. La—Al$_2$O$_3$ was activated alumina containing 4% by mass of La$_2$O$_3$, and supported 0.86% by mass of Pd. The ZrY binder was ZrY sol (sol of ZrY mixed oxide powder) obtained by wet grinding ZrO$_2$ containing 3 mol % of Y$_2$O$_3$. The ZrY mixed oxide powder had a particle size distribution (frequency distribution) in which a peak particle size value was in the range of 100 nm to 300 nm, both inclusive. Pd was supported by evaporation to dryness. The catalytic metal such as Pd etc. was supported by evaporation to dryness in the other examples and comparative examples.

The first catalyst layer 2 supported 35 g/L of Pd/CeZrNdO (Pd=0.175 g/L), 45 g/L of Pd/La—Al$_2$O$_3$ (Pd=0.36 g/L), and 12 g/L of the ZrY binder per L of the support.

Rh/CeZrNdO contained in the second catalyst layer 3 was provided by supporting Rh as the catalytic metal 11 on CeZrNdO (mixed oxide containing Ce, Zr, and Nd) as the Ce-containing oxide particles 12. CeZrNdO had a composition of CeO$_2$:ZrO$_2$:Nd$_2$O$_3$=10:80:10 (mass ratio). Rh/ZrLa/Al$_2$O$_3$ was provided by supporting Rh as the catalytic metal 11 on ZrLa/Al$_2$O$_3$ particles. The ZrLa/Al$_2$O$_3$ particles included ZrLa mixed oxide particles 9 supported on the surfaces of the activated alumina particles 8, and had a composition of ZrO$_2$:La$_2$O$_3$:Al$_2$O$_3$=38:2:60 (% by mass).

The ZrLa/Al$_2$O$_3$ particles were prepared in the following manner. Activated alumina powder was dispersed in a solution mixture of zirconium nitrate and lanthanum nitrate. Ammonia water was added to the solution mixture to generate a precipitate (coprecipitation). The obtained precipitate was filtered, washed, dried at 200° C. for 2 hours, baked at 500° C. for 2 hours, and pulverized. Thus, the ZrLa/Al$_2$O$_3$ particles were obtained.

The Rh-doped CeO$_2$ binder of the second catalyst layer 3 was Rh-doped CeO$_2$ sol in which CeO$_2$ was doped with Rh (Rh concentration: 0.05% by mass). The sol was prepared in the following manner. Cerium nitrate hexahydrate and a rhodium nitrate solution were dissolved in ion-exchanged water. An 8-fold diluted solution of ammonia water of 28% by mass was added to the nitrate solution to neutralize the solution, thereby obtaining a coprecipitate. The coprecipitate was washed with water by centrifugal separation, dried in the air at 150° C. for a whole day and night, pulverized, and baked at 500° C. in the air for 2 hours to obtain Rh-doped CeO$_2$ powder. Ion-exchanged water was added to the obtained powder to prepare slurry (solid content: 25% by mass). The slurry was placed in a ball mill, and was pulverized with 0.5 mm diameter zirconia beads (about 3 hours). Thus, sol dispersing the Rh-doped CeO$_2$ powder of reduced particle size was obtained.

The Rh-doped CeO powder had a particle size distribution (frequency distribution) in which a peak particle size value was in the range of 100 nm to 300 nm, both inclusive.

The second catalyst layer 3 supported 70 g/L of Rh/CeZrNdO (Rh=0.084 g/L), 30 g/L of Rh/ZrLa/Al$_2$O$_3$ (Rh=0.03 g/L), and 12 g/L of the Rh-doped CeO$_2$ binder (Rh=0.006 g/L).

A catalyst of Example 1 was prepared in the following manner. First, Pd/CeZrNdO, Pd/La—Al$_2$O$_3$, and the ZrY sol were mixed to prepare slurry, and the slurry was applied to the support, dried, and baked to form the first catalyst layer 2. Then, Rh/CeZrNdO, Rh/ZrLa/Al$_2$O$_3$, and the Rh-doped CeO$_2$ sol were mixed to prepare slurry, and the slurry was applied to the first catalyst layer 2, dried, and baked to form the second catalyst layer 3.

Example 2

A catalyst of the same structure as the catalyst of Example 1 was prepared in the same manner as Example 1 except that the ZrY binder used in the first catalyst layer 2 was replaced with a ZrNd binder, and the Rh-doped CeO$_2$ binder used in the second catalyst layer 3 was replaced with a Rh-doped CeZr binder.

The ZrNd binder was ZrNd sol obtained by wet grinding ZrO$_2$ containing 3 mol % of Nd$_2$O$_3$. The ZrNd sol had the same particle size distribution as the ZrY sol. The Rh-doped CeZr binder was Rh-doped CeZr sol (Rh concentration: 0.05% by mass) obtained by doping CeZr mixed oxide (CeO$_2$:ZrO$_2$=25:75 (mass ratio)) with Rh. The Rh-doped CeZr sol was prepared in the same manner as the Rh-doped CeO$_2$ sol of Example 1 except that a nitrate solution prepared by dissolving cerium nitrate hexahydrate, a zirconyl nitrate solution, and a rhodium nitrate solution in ion-exchanged water was used. Like the Rh-doped CeO$_2$ sol, the Rh-doped CeZr sol had a particle size distribution (frequency distribution) in which a peak particle size value was in the range of 100 nm to 300 nm, both inclusive.

Example 3

A catalyst of the same structure as the catalyst of Example 1 was prepared using the ZrY binder in the same manner as Example 1 except that the Rh-doped CeO$_2$ binder used in the second catalyst layer 3 was replaced with a Rh-doped CeZrNd binder.

The Rh-doped CeZrNd binder was Rh-doped CeZrNd sol (Rh concentration: 0.05% by mass) in which CeZrNd mixed oxide (CeO$_2$:ZrO$_2$:Nd$_2$O$_3$=10:80:10 (mass ratio)) was doped with Rh. The Rh-doped CeZrNd sol was prepared in the same manner as the Rh-doped CeO$_2$ sol of Example 1 except that a nitrate solution prepared by dissolving cerium nitrate hexahydrate, a zirconyl nitrate solution, neodymium nitrate hexahydrate, and a rhodium nitrate solution in ion-exchanged water was used. Like the Rh-doped CeO$_2$ sol, the Rh-doped CeZrNd sol had a particle size distribution (frequency distribution) in which a peak particle size value was in the range of 100 nm to 300 nm, both inclusive.

Example 4

A catalyst of the same structure as the catalyst of Example 1 was prepared using the ZrY binder in the same manner as Example 1 except that the Rh-doped $CeO_2$ binder used in the second catalyst layer 3 was replaced with a Rh-doped CeZrLa binder.

The Rh-doped CeZrLa binder was Rh-doped CeZrLa sol (Rh concentration: 0.05% by mass) in which CeZrLa mixed oxide ($CeO_2:ZrO_2:La_2O_3=10:80:10$ (mass ratio)) was doped with Rh. The Rh-doped CeZrLa sol was prepared in the same manner as the Rh-doped $CeO_2$ sol of Example 1 except that a nitrate solution prepared by dissolving cerium nitrate hexahydrate, a zirconyl nitrate solution, lanthanum nitrate hexahydrate, and a rhodium nitrate solution in ion-exchanged water was used. Like the Rh-doped $CeO_2$ sol, the Rh-doped CeZrLa sol had a particle size distribution (frequency distribution) in which a peak particle size value was in the range of a particle diameter of 100 nm to 300 nm, both inclusive.

Example 5

A catalyst of the same structure as the catalyst of Example 1 was prepared using the ZrY binder in the same manner as Example 1 except that the Rh-doped $CeO_2$ binder used in the second catalyst layer 3 was replaced with a Rh-doped CeZrNdY binder.

The Rh-doped CeZrNdY binder was Rh-doped CeZrNdY sol (Rh concentration: 0.05% by mass) in which CeZrNdY mixed oxide ($CeO_2:ZrO_2:Nd_2O_3:Y_2O_3=10:80:5:5$ (mass ratio)) was doped with Rh. The Rh-doped CeZrNdY sol was prepared in the same manner as the Rh-doped $CeO_2$ sol of Example 1 except that a nitrate solution prepared by dissolving cerium nitrate hexahydrate, a zirconyl nitrate solution, neodymium nitrate hexahydrate, yttrium nitrate hexahydrate, and a rhodium nitrate solution in ion-exchanged water was used. Like the Rh-doped $CeO_2$ sol, the Rh-doped CeZrNdY sol had a particle size distribution (frequency distribution) in which a peak particle size value was in the range of 100 nm to 300 nm, both inclusive.

Example 6

A catalyst of the same structure as the catalyst of Example 5 was prepared in the same manner as Example 5 except that 20 g/L of CeZrNdO (supporting no catalytic metal) was mixed in the first catalyst layer 2, and 10 g/L of La—$Al_2O_3$ (supporting no catalytic metal) was mixed in the second catalyst layer 3. CeZrNdO was CeZrNd mixed oxide having a composition of $CeO_2:ZrO_2:Nd_2O_3=23:67:10$ (mass ratio). La—$Al_2O_3$ was activated alumina containing 4% by mass of $La_2O_3$.

Comparative Example 1

A catalyst of Comparative Example 1 was different from the catalyst of Example 1 in that the ZrY binder was used in place of the Rh-doped $CeO_2$ binder in the second catalyst layer 3, and the amount of supported Rh/ZrLa/$Al_2O_3$ in the second catalyst layer 3 was set to 36 g/L (Rh=0.036 g/L) in such a manner that the total amount of supported Rh was the same as that in the catalyst of Example 1.

Comparative Example 2

A catalyst of Comparative Example 2 was different from the catalyst of Example 1 in that a Rh-doped $CeO_2$ binder was used in place of the ZrY binder in the first catalyst layer 2, and the ZrY binder was used in place of the Rh-doped $CeO_2$ binder in the second catalyst layer 3. Specifically, the binders in the first catalyst layer 2 and the second catalyst layer 3 of Example 1 were contained in the second catalyst layer 3 and the first catalyst layer 2 of Comparative Example 2.

Comparative Example 3

A catalyst of Comparative Example 3 was different from the catalyst of Example 1 in that a Rh-doped $CeO_2$ binder was used in place of the ZrY binder in the first catalyst layer 2, and the amount of supported Rh/ZrLa/$Al_2O_3$ in the second catalyst layer 3 was set to 24 g/L (Rh=0.024 g/L) in such a manner that the total supported amount of Rh was the same as that in the catalyst of Example 1.

Comparative Example 4

A catalyst of Comparative Example 4 was prepared in the same manner as the catalyst of Comparative Example 1 except that 20 g/L of CeZrNdO (supporting no catalytic metal) was mixed in the first catalyst layer 2, and 10 g/L of La—$Al_2O_3$ (supporting no catalytic metal) was mixed in the second catalyst layer 3 in the same manner as Example 6.

[Evaluation of Exhaust Gas Purification Performance]

Each of the catalysts of Examples 1-6 and Comparative Examples 1-4 was bench-aged. Specifically, with the catalyst attached to an engine exhaust system, the engine was allowed to run in such a manner that a cycle of (1) streaming exhaust gas of A/F=14 for 15 seconds, (2) streaming exhaust gas of A/F=17 for 5 seconds, and (3) streaming exhaust gas of A/F=14.7 for 40 seconds was repeated for 50 hours in total, and that a temperature of the gas at the entrance of the catalyst was 900° C.

Then, a core sample having a support capacity of about 25 mL (25.4 mm in diameter, 50 mm in length) was cut out from each catalyst, and the core sample was placed in a gas flow reactor to measure a light-off temperature T50 (° C.) and a rate of exhaust gas purification C400 concerning the purification of HC, CO, and NOx. The light-off temperature T50 (° C.) is a temperature of the exhaust gas measured at the entrance of the catalyst when the purification rate reached 50% by gradually increasing the temperature of model exhaust gas flowing into the catalyst from a normal temperature. The rate of exhaust gas purification C400 is a rate of purification of each gas component when the temperature of the model exhaust gas at the entrance of the catalyst was 400° C. The model exhaust gas had A/F=14.7±0.9. Specifically, a mainstream gas of A/F=14.7 was allowed to constantly flow, and a predetermined amount of gas for changing the A/F ratio was added in pulses at a rate of 1 Hz, thereby forcedly oscillating the A/F ratio in the range of ±0.9. Space velocity SV was 60000 $h^{-1}$, and a rate of temperature increase was 30° C./minute. Table 1 shows compositions of gas when the A/F ratio was 14.7, 13.8, and 15.6. Table 2 shows the results of measurement of T50 and C400.

TABLE 1

| A/F | 13.8 | 14.7 | 15.6 |
|---|---|---|---|
| $C_3H_6$ (ppm) | 541 | 555 | 548 |
| CO (%) | 2.35 | 0.60 | 0.59 |
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | 10 | 10 | 10 |

TABLE 2

| | Binder | | T50 (° C.) | | | C400 (%) | | |
|---|---|---|---|---|---|---|---|---|
| | 2nd catalyst layer (upper layer) | 1st catalyst layer (lower layer) | HC | CO | NOx | HC | CO | NOx |
| Example 1 | Rh-doped CeO₂ sol | ZrY sol | 263 | 257 | 254 | 99 | 98 | 100 |
| Example 2 | Rh-doped CeZr sol | ZrNd sol | 260 | 255 | 252 | 99 | 99 | 100 |
| Example 3 | Rh-doped CeZrNd sol | ZrY sol | 258 | 251 | 247 | 99 | 99 | 100 |
| Example 4 | Rh-doped CeZrLa sol | ZrY sol | 259 | 253 | 249 | 99 | 99 | 100 |
| Example 5 | Rh-doped CeZrNdY sol | ZrY sol | 256 | 251 | 246 | 99 | 99 | 100 |
| Example 6 | Rh-doped CeZrNdY sol (La—Al₂O₃ added) | ZrY sol (CeZrNdO added) | 254 | 248 | 245 | 99 | 99 | 100 |
| Comparative Example 1 | ZrY sol | ZrY sol | 265 | 259 | 259 | 99 | 99 | 100 |
| Comparative Example 2 | ZrY sol | Rh-doped CeO₂ sol | 271 | 265 | 263 | 98 | 98 | 100 |
| Comparative Example 3 | Rh-doped CeO₂ sol | Rh-doped CeO₂ sol | 268 | 262 | 260 | 98 | 98 | 100 |
| Comparative Example 4 | ZrY sol (La—Al₂O₃ added) | ZrY sol (CeZrNdO added) | 261 | 255 | 254 | 99 | 99 | 100 |

The catalyst of Example 1 had the light-off temperature T50 lower than that of the catalyst of Comparative Example 1 (the rate of exhaust gas purification C400 was similar to that of the catalyst of Comparative Example 1). This indicates that the Rh-doped CeO₂ sol capable of storing and releasing oxygen is more advantageous than the ZrY sol having oxygen ion conductivity for providing the second catalyst layer 3 with improved light-off performance. Although Rh mainly acts on reduction and purification of NOx, this is presumably because Rh in the Rh-doped CeO₂ binder of the second catalyst layer 3 of Example 1 is easily turned to Rh in the metal state (advantageous in reducing NOx) since CeO₂ stores oxygen when the A/F is lean, and Rh-doped CeO₂ is used as the binder. This allows the exhaust gas to contact Rh in the binder more frequently.

In Example 1, the binder of the second catalyst layer 3 was doped with Rh. Therefore, the amount of supported Rh/ZrLa/Al₂O₃ was reduced by 6 g/L as compared with Comparative Example 1 (reduced by 6 g/L in the whole second catalyst layer 3). This indicates that thermal capacity of the catalyst is reduced, which advantageously improves the light-off performance.

Although the catalyst of Comparative Example 2 included the Rh-doped CeO₂ sol in the first catalyst layer 2, the light-off performance was lower than that of the catalyst of Comparative Example 1. This indicates that the Rh-doped CeO₂ sol is advantageously used in the second catalyst layer 3. The catalyst of Comparative Example 3 in which the Rh-doped CeO₂ sol was used in both of the first catalyst layer 2 and the second catalyst layer 3 showed improved light-off performance as compared with the catalyst of Comparative Example 2, but the light-off performance was lower than that of Example 1. This indicates that the ZrY binder having the oxygen ion conductivity is advantageously used in the first catalyst layer 2. Although Pd mainly acts on oxidation and purification of HC and CO, the ZrY binder captures oxygen in the atmosphere, and releases active oxygen whether the exhaust gas atmosphere is lean or rich. The active oxygen presumably keeps Pd in the oxidized state, which is advantageous for oxidation and purification of HC and CO.

The catalyst of Example 2 showed better light-off performance than that of the catalyst of Example 1. A presumable cause of this result is that the Rh-doped CeZr binder has higher thermal resistance than the Rh-doped CeO₂ binder. The catalyst of Example 3 showed better light-off performance than that of the catalyst of Example 1. This is presumably derived from the high thermal resistance, and improved capability of storing and releasing oxygen of the Rh-doped CeZrNd binder as compared with the Rh-doped CeO₂ binder. The catalyst of Example 4 showed better light-off performance than that of Example 1, although the light-off performance was slightly lower than that of Example 3. This indicates that the Rh-doped CeZrLa binder is advantageously used. The catalyst of Example 5 showed much better light-off performance than that of Example 3. This indicates the advantage of the Rh-doped CeZrNdY binder.

The catalyst of Example 6 was prepared by adding CeZrNdO (supporting no catalytic metal) to the first catalyst layer 2 of Example 5, and adding La—Al₂O₃ (supporting no catalytic metal) to the second catalyst layer 3 of Example 5. The catalyst of Example 6 showed better light-off performance than that of Example 5 as a result of addition of CeZrNdO and La—Al₂O₃. The effect of the addition of CeZrNdO and La—Al₂O₃ can be observed by comparing Example 6 and Comparative Examples 1 and 4.

What is claimed is:

1. An exhaust gas purification catalyst comprising:
a plurality of catalyst layers stacked on a carrier, wherein
at least one catalytic metal of Pd, Pt, or Rh is supported on at least one of oxide particles of activated alumina particles or Ce-containing oxide particles in a first catalyst layer of the plurality of catalyst layers, and first binder particles which are fine, and made of mixed oxide containing Zr and rare earth metal except for Ce, and have oxygen ion conductivity, and a particle size distribution represented by frequency in which a peak particle size value is in the range of 100 nm to 300 nm, both inclusive, are interposed among the oxide particles, and
at least one catalytic metal of Pd, Pt, or Rh is supported on at least one of oxide particles of activated alumina particles or Ce-containing oxide particles in a second catalyst layer of the plurality of catalyst layers formed on or above the first catalyst layer, and second binder particles which are fine, are made of catalytic metal-doped mixed oxide containing Ce, and the catalytic metal, and are capable of storing and releasing oxygen depending on a change in an oxygen concentration in the exhaust gas are interposed among the oxide particles.

2. The exhaust gas purification catalyst of claim 1, wherein the second binder particles are made of at least one of $CeO_2$ doped with a catalytic metal, CeZr mixed oxide doped with a catalytic metal, CeZrNd mixed oxide doped with a catalytic metal, CeZrLa mixed oxide doped with a catalytic metal, or CeZrNdY mixed oxide doped with a catalytic metal.

3. The exhaust gas purification catalyst of claim 1, wherein the rare earth metal except for Ce in the first binder particles is at least one of Y, Nd, or La.

4. The exhaust gas purification catalyst of claim 1, wherein the second binder particles have a particle size distribution represented by frequency in which a peak particle size value is in the range of 100 nm to 300 nm, both inclusive.

* * * * *